Figures 1, 2, 3:
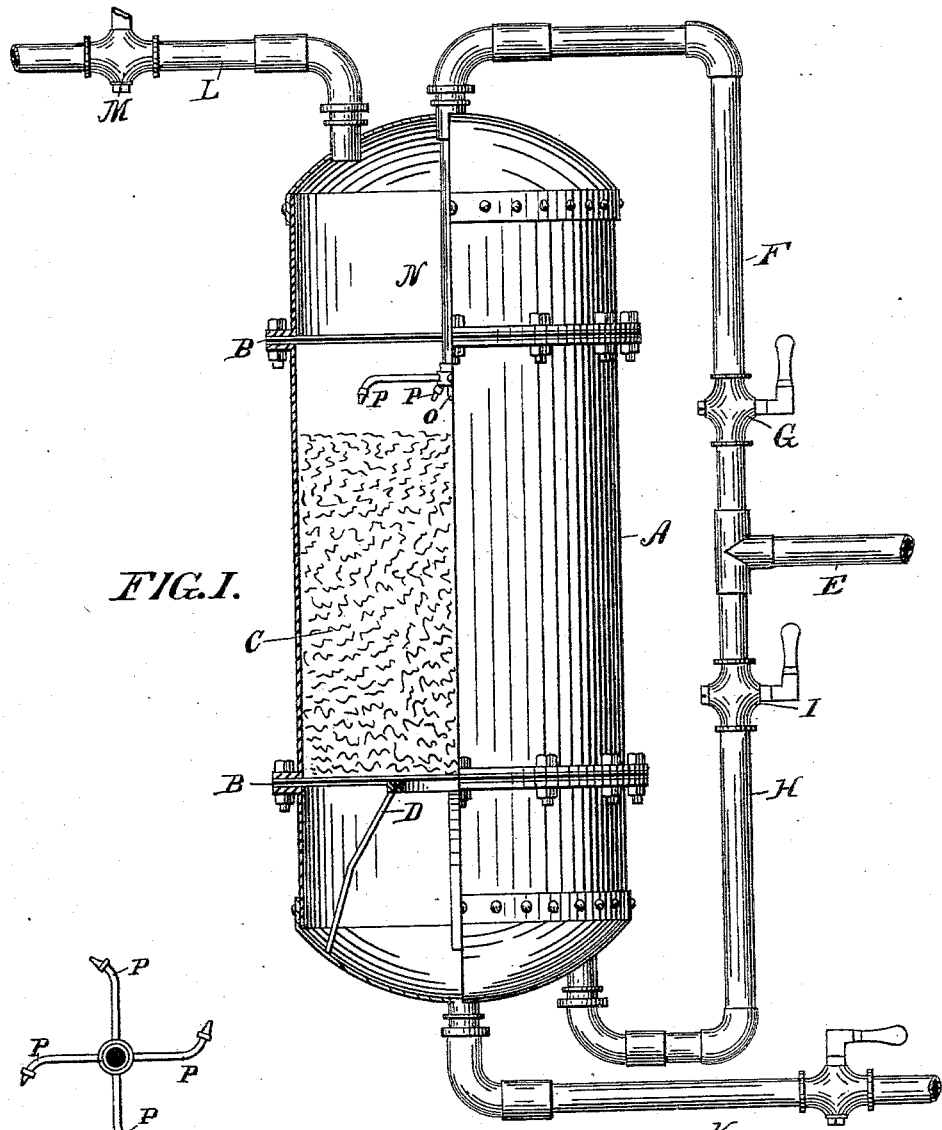

(No Model.)

C. H. DIRMITT & G. W. WALTERS.
WATER FILTER.

No. 425,537. Patented Apr. 15, 1890.

WITNESSES:
INVENTOR

UNITED STATES PATENT OFFICE.

CHARLES H. DIRMITT AND GEORGE W. WALTERS, OF PHILADELPHIA, PENNSYLVANIA.

WATER-FILTER.

SPECIFICATION forming part of Letters Patent No. 425,537, dated April 15, 1890.

Application filed February 6, 1890. Serial No. 339,459. (No model.)

*To all whom it may concern:*

Be it known that we, CHARLES H. DIRMITT and GEORGE W. WALTERS, citizens of the United States of America, residing at Philadelphia, in the county of Philadelphia and State of Pennsylvania, have invented certain new and useful Improvements in Water-Filters, of which the following is a specification, reference being had therein to the accompanying drawings.

Our invention relates to a water-filter; and it consists in a construction thereof by which it is readily, easily, and effectually cleaned.

Referring to the accompanying drawings, Figure 1 is a view of our filter, partly in plan and partly in section. Fig. 2 is a top view of the lower diaphragm with its support. Fig. 3 is a top view of the inclined outlets of the inlet-pipe.

A is a filter shown partly in plan and partly in section.

B B are diaphragms of wire-gauze, one above and one below the filtering material C.

D is a support under the diaphragms, which carries the weight of the filtering material.

E is an inlet-pipe from the main with two branches, one F entering above the filtering material with a cock or valve G, the other H entering below the filtering material with a cock or valve I.

K is a discharge-pipe for filtered water.

L is a waste-pipe with cock or valve M.

N is a downward extension of the pipe F, reaching proximately to the surface of the filtering material and furnished at its bottom with a vertical outlet O, by which the mud and water above the filtering material are stirred up, and downward and laterally-inclined outlets P, by which when the water is discharged freely from them a rotary motion is given to the water above the filtering material.

In the usual operation of the filter valves I and M are closed and valve G is open. When there is an accumulation of sediment in the filter, the most of which is always above or very near to the surface of the filtering material, the valve M is opened and the water is freely discharged from above the filtering material, the water passing down and then up toward the sides of the filter if there be but a vertical outlet, as at O, or around, sweeping the sides of the filter if there be one or more inclined outlets, as at P, carrying off the very much greater part of the sediment, cleaning the filter very quickly and quite sufficiently for ordinary purposes. Occasionally, for still further purification, after the operation above described the valve G is closed and the valve I opened and the filtering material is rinsed clean by the water passing upward through it; but it will be found that very little sediment has escaped the first operation. We may use the vertical discharge alone with good effect; but we attain a more thorough stirring up of the sediment by the rotary motion described.

We claim as our invention—

1. In a water-filter having its filtering material between two perforated diaphragms and having water-spaces above and below the space between said diaphragms, and having an inlet and an outlet pipe above and an inlet and an outlet pipe below the filtering material, an upper inlet-pipe having its discharge within the filter below the upper diaphragm and proximately at the surface of the filtering material, substantially as and for the purpose set forth.

2. In a water-filter having its filtering material between two perforated diaphragms and having water-spaces above and below the space between said diaphragms, and having an inlet and an outlet pipe above and an inlet and an outlet pipe below the filtering material, and having an upper inlet-pipe whose discharge is within the filter and proximately at the surface of the filtering material, an outlet to said last-named inlet-pipe below the upper diaphragm so inclined as to discharge the water passing from it sidewise, whereby a rotary motion is imparted to the water above, and the upper part of the filtering material and the accumulated sediment is discharged and the filtering material is retained.

In testimony whereof we affix our signatures in presence of two witnesses.

CHARLES H. DIRMITT.
GEORGE W. WALTERS.

Witnesses:
G. MORGAN ELDRIDGE,
SAML. P. HANSON.